United States Patent [19]

Jamet et al.

[11] 3,943,057

[45] Mar. 9, 1976

[54] MEMBRANE SUPPORT-PLATES AND FLUID SEPARATING APPARATUS IN WHICH THEY ARE PRESENT

[75] Inventors: Bruno Jamet; Jean Roget, both of Lyon, France

[73] Assignee: Rhone-Poulenc, S.A., Paris, France

[22] Filed: July 10, 1974

[21] Appl. No.: 487,024

[30] Foreign Application Priority Data

July 11, 1973 France .......................... 73.25451

[52] U.S. Cl. ...................... 210/321 R; 210/433 M
[51] Int. Cl.² ....................................... B01D 31/00
[58] Field of Search ................... 210/321, 231, 433; 159/DIG. 27, DIG. 28

[56] References Cited
UNITED STATES PATENTS

| | | | |
|---|---|---|---|
| 3,219,573 | 11/1965 | Chen et al. | 159/DIG. 27 |
| 3,497,423 | 2/1970 | Rodgers | 159/DIG. 28 |
| 3,695,445 | 10/1972 | Esmond | 210/321 |
| 3,757,955 | 9/1973 | Leonard | 210/321 |
| 3,765,981 | 10/1973 | Rogers | 159/DIG. 27 |
| 3,827,563 | 8/1974 | Boe et al. | 210/321 |
| 3,831,763 | 8/1974 | Breysse et al. | 210/321 |

OTHER PUBLICATIONS

Report No.–2624, p. 13, Office at Salme Water Research and Development.

Primary Examiner—Theodore A. Granger
Attorney, Agent, or Firm—Stevens, Davis, Miller & Mosher

[57] ABSTRACT

Membrane support plate for fluid separating apparatus, in which the support plate is made up of at least five flat elements secured together in face-to-face relationship. A central element has cut-out slots to remove the permeate which has passed through the membranes, intermediate elements have holes aligned with the slots and outer elements have a central orifice which forms a cell on each face of the plate, porous packing elements being placed in the cells, with the membranes on top of the packing elements.

8 Claims, 6 Drawing Figures

MEMBRANE SUPPORT-PLATES AND FLUID SEPARATING APPARATUS IN WHICH THEY ARE PRESENT

The present invention relates to a membrane support-plate as well as to any apparatus for separating fluids by selective permeability in which such support-plates are present.

Support-plates and apparatuses of this type are known, especially from published French Pat. Application No. 2,127,155 and its addition No. 2,141,417. These support-plates possess, at each of their ends, an elongated orifice through which the fluid to be treated passes, and a cell on each of their faces, between the two elongated orifices, each cell containing a packing and a membrane. In such plates, the fluid which has passed through the membranes is recovered through a pipeline which is situated on the edge of the plate and communicates with the wall of the cell.

However, it appeared to be more advantageous to make the fluid which has passed through the membranes, called the permeate, to pass through the wall at the bottom of each cell, and for this purpose the latter is thus provided with holes communicating with means for collecting the permeate situated inside the support-plate between the two cells. This embodiment of a support-plate makes it possible considerably to simplify its manufacture and consequently to reduce its cost, because a support-plate can then be produced from flat elements, essentially by cutting up sheets or plates of rigorously calibrated thickness which are available direct from the suppliers.

According to the present invention, we provide a membrane support-plate for fluid separating apparatus, said support-plate comprising a plurality of substantially flat elements superposed in face-to-face relation and joined to one another in a leakproof manner, each flat element being substantially symmetrical relative to a median plane passing through its thickness, said elements defining, on each face of the support plate, a cell forming recess, means for discharging from said cell permeate which has passed, in use, through a membrane placed on the associated face of the cell and, at at least one of the ends of the rectangular plate, at least one aperture for the passage of the fluid to be treated, said at least one aperture extending through the entire thickness of the support plate.

The invention also provides fluid separating apparatus including two end plates, a pipeline for feeding fluid to one of said end plates and a pipeline for removing fluid from the other of said end plates and a stack of membrane support-plates each having a membrane on each face, each of said support plates as defined above.

In order that the invention will be better understood, the following description is given, by way of example, reference being made to the accompanying drawings, in which.

A membrane support-plate according to the present invention, the shape of which is generally rectangular, results from joining flat elements together and comprises, on each of its faces, at least one cell which receives a membrane preferably resting on a porous support. A support-plate has at least one preferably elongated aperture at at least one of its ends, through which the fluid to be treated passes. Such a support-plate is substantially symmetrical relative to the longitudinal median plane perpendicular to the face of the cells. When the support-plates according to the present invention have to be positioned vertically in an apparatus, the latter preferably possesses bars or shaped sections in the horizontal position, on which the support-plates are suspended by means of notches advantageously provided at least in their upper part. In this case, the permeate is generally discharged in the lower part of each plate.

Figure 1:
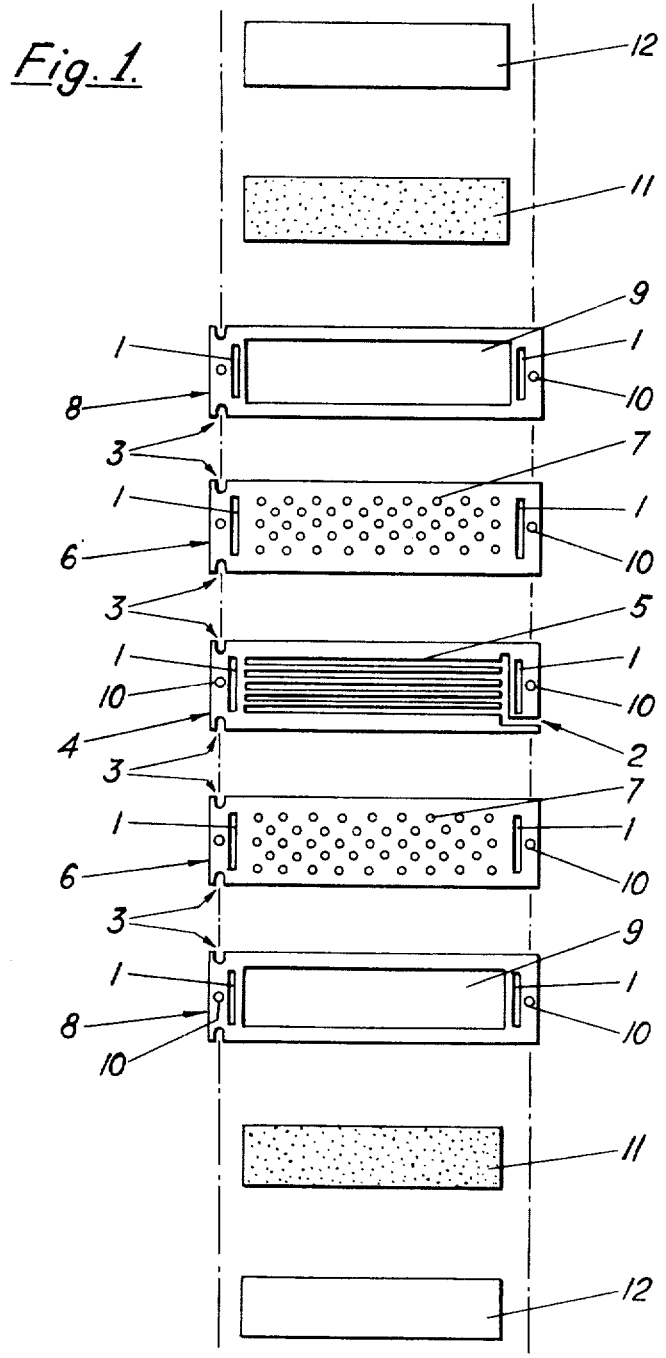
FIG. 1 is an exploded plan view of the various elements of one embodiment of support-plate according to the present invention.
Figure 2:
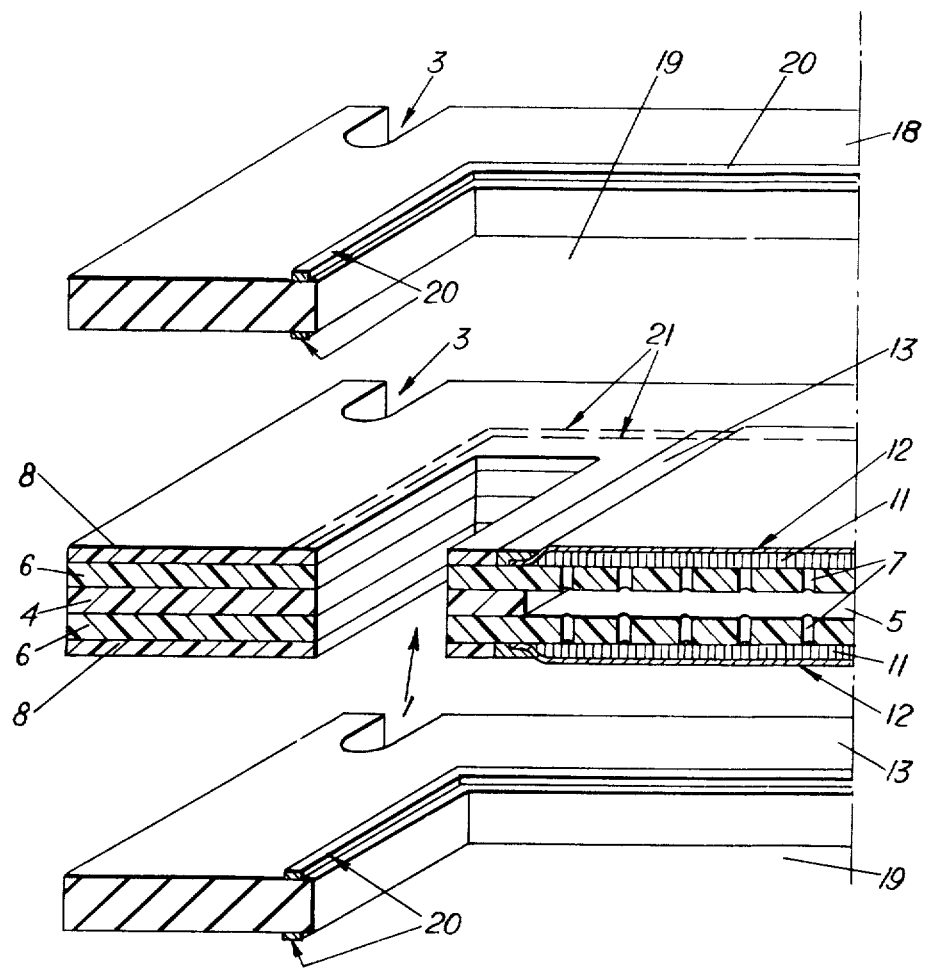
FIG. 2 is a partial view in perspective and in cross-section along a plane parallel to the longitudinal axis of the support-plate of FIG. 1, with an exploded view of a gasket on either side of the support-plate.

FIG. 1 shows more precisely the various flat elements of one embodiment of a support-plate according to the present invention, having at each of its ends, an elongated aperture 1 through which the fluid to be treated passes. This support-plate is more especially designed to be mounted vertically in an apparatus, because it comprises means 2 for discharging the permeate at one of its ends and notches 3 for positioning the support-plate at the other end. FIG. 2 shows especially the various elements of FIG. 1, after they have been assembled. The support-plate represented in FIGS. 1 and 2 comprises:

a. a central element 4 having cut-outs 5 parallel to one another, for collecting the permeate, opening into a cut-out 2, for discharging the permeate, this cut-out opening at one end of the element considered;

b. an intermediate element 6, on either side of the central element 4, each intermediate element 6 having holes 7 communicating with the cut-outs 5 of the central element 4;

c. an outer element 8 on each intermediate element 6, each outer element 8 having a central orifice 9 which, together with the intermediate element 6, forms a cell for the support-plate considered, the base of this cell, having the holes 7, being formed by the intermediate element 6;

d. an elongated aperture 1 at each end of the elements 4, 6 and 8, these apertures being superposed on top of one another after the said elements have been assembled and forming the apertures 1 of the support-plate considered; and e. notches 3 at one end of the elements 4, 6 and 8, these notches being superposed on top of one another after the said elements have been assembled and forming the notches 3 of the support-plate considered.

In FIG. 1, each flat element 4, 6 and 8 has at each of its ends, a hole 10 which facilitates the positioning of the flat elements when they are being assembled, which will be referred to later. This hole 10 corresponds to one method of assembling and is not absolutely necessary.

Each of the flat elements 4, 6 and 8 described above is symmetrical relative to a median plane passing through its thickness. Each flat element is likewise generally symmetrical relative to a longitudinal median plane perpendicular to its two large opposite faces.

After the various flat elements 4, 6 and 8 of a support-plate have been assembled in a leakproof manner, a porous support 11 and a membrane 12 suited to the separation operation considered are placed in each cell 9, the dimensions of which correspond to those of the central orifice 9 of the outer element 8 and which, for this reason, have the same reference number. The porous support 11 can, for example, be made of non-woven material such as polyethylene glycol terephthalate, or of paper impregnated with phenol/formaldehyde resin. In FIG. 2, the porous support 11 substantially fills the cell, except at the transverse ends of the latter where it is covered by the transverse ends of the membrane 12, the width of which corresponds to that of the porous support 11. An adhesive tape 13 is advantageously placed at the transverse ends of each cell in order to hold the membrane and to compensate, at least partially, for unevenness in thickness at this position. The porous support 11 is advantageously held at the base of the cell by means of a double-sided adhesive tape which is positioned near each longitudinal edge of the cell considered. By way of a variant (not shown), the porous support 11 can have exactly the same dimensions as the cell and the membrane 12 can then be folded over at its transverse ends, under the porous support 11, and glued at the base of the cell.

A support-plate like that represented in FIGS. 1 and 2 comprises flat elements 4, 6 and 8 produced essentially by cutting up tapes or sheets, preferably of plastic. The holes 7 of the intermediate elements 6 can be formed by piercing or punching. These flat elements are held together in a leakproof and definitive manner, for example by means of glue or by means of an adhesive tape.

When glue is used, it is advantageous that it should be able to be applied at high speed. It is also valuable that it should be able to be reactivated by adding a solvent or by heating, which makes it possible to effect a prior coating of the flat elements, and then to reactivate the glue at the very moment when the said flat elements are being assembled.

If the flat elements 4, 6 and 8 are made of polyvinyl chloride, it is possible to use a glue based on a vinyl resin, for example polyvinyl chloride, in solvents such as cyclohexanone. As glues which can be reactivated by heat, it is possible, for example, to use glues based on polyvinyl acetate, optionally with other copolymers.

When the flat elements 4, 6 and 8 are made of a copolymer comprising acrylonitrile, butadiene and styrene (ABS), it is possible to use a glue based on chloroprene, generally in aromatic solvents such as toluene or xylene. As glues which can be reactivated by heat, it is possible to use glues based on thermoplastic polyesters, for example the terpolymer produced from terephthalic, isophthalic and adipic acids and butenediol.

It is advantageous, especially when a glue which can be reactivated by heat is used, to coat the central element 4 before cutting out the means for collecting 5 and discharging 2 the permeate. This makes it possible, thereafter, to prevent the permeate from coming into contact with the glue. When using the gluing technique, it is sufficient, for example, to coat the central element 4 on both its faces and the outer element 8 only on the face adjacent to the intermediate element 6. The flat elements 4, 6 and 8 are then mounted between the heated platens of a press, after having been centred, for example on two guiding rods passing through the holes 10 of the said elements. After cooling to below the melting point of the glue, the support-plate is then removed from the platens and allowed to return to ambient temperature before the porous support 11 and the membrane 12 are assembled.

When the flat elements 4, 6 and 8 of a support-plate are joined to one another by means of adhesive tapes, the following procedure can be used. For example, a double-sided adhesive tape is used and such a tape is placed on each face of the central element 4 which is thereafter cut to the desired shape. A double-sided adhesive tape is likewise placed on one of the faces of the outer element 8. In order to assemble the flat elements, the elements 4, 6 and 8 are, for example, placed between two platens which make it possible to exert a slight pressure on the said elements, at ambient temperature, these platens advantageously comprising two centering rods which pass through holes 10 generally provided on the flat elements 4, 6 and 8. The first step is to place an outer element 8 on the lower platen so that the sticky face of the said element is not adjacent to the said platen. Before placing this element on the platen, it is preferable to remove the paper protecting the adhesive tape. Thereafter, an intermediate element 6 is placed in position, followed by the central element 4 from which the paper which protects the adhesive tape has been removed beforehand on each face of the element. An intermediate element 6 is then placed in position followed by an outer element 8 from which the paper which protects the adhesive tape has been removed, the sticky face of the outer element 8 being adjacent to the intermediate element 6. The upper platen of the press can then exert a slight pressure in order to make it possible to bring the various elements into better contact. The support-plate is then ready to receive a porous support and a membrane in each cell.

By way of variant, in a support-plate as described above, the means for collecting 5 and discharging 2 the permeate of the central element 4 can comprise a single inner cut-out, forming a window, in relation to the section of the element considered. Advantageously, in order to improve the rigidity of the plate, it is possible to place, inside this window, a component which allows the permeate to flow, this component being, for example, a grid produced from two webs of crossed and heat-sealed polyethylene yarns.

Figure 3:
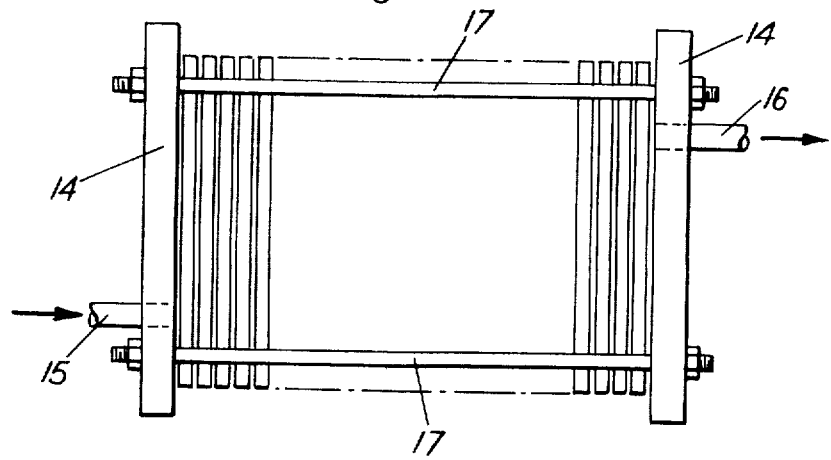
FIG. 3 is a view in elevation of one form of fluid separating apparatus incorporating the supportplates according to the invention.

The external appearance of an apparatus for effecting separation by selective permeability, comprising support-plates as described above, is represented in FIG. 3. This apparatus comprises two rigid end plates 14, one of which has at least one pipeline 15 for introducing the fluid to be treated and the other of which has at least one pipeline 16 for discharging the treated fluid which has not passed through the membranes 12. The support-plates (described above) alternating with gaskets 18 which have substantially the same outer dimensions as the flat elements 4, 6 and 8 and contain a central window 19, the width of which is slightly less than that of the cell and the length of which corresponds substantially to the maximum distance between the two elongated apertures 1, are clamped between the two end plates 14, by means of threaded rods 17. These gaskets 18 can be made of flexible rubber, but they are advantageously made of a rigid or semi-rigid material, on which there is placed, on each face, a leakproofing cord 20, the hardness of which is generally less than that of the rigid or semi-rigid material forming the gasket 18. This leakproofing cord 20 can be made of silicone elastomer, polyvinyl chloride or cellular epoxy resin and can be placed in position especially be serigraphy or overmoulding. In FIG. 2, the broken line 21 shows the positioning of a cord 20 on a support-plate when the latter is in contact with a gasket 18. A gasket 18 can optionally have positioning notches 3. The thickness of the gasket 18 determines the thickness of the sheet of fluid to be treated flowing in contact with the membranes.

In the apparatus which is described above and which comprises support-plates with an elongated aperture 1 at each end, the liquid to be treated flows in parallel between each support-plate, whilst the permeate is collected in the lower part of each plate.

When an apparatus comprises support-plates which have an elongated aperture 1 at only one of their ends, the support-plates, alternating with gaskets 18, have their aperture 1 alternately at the top and then at the bottom, and this ensures that the fluid to be treated flows in series and zig-zags inside the apparatus, whilst the permeate is recovered at the foot of the apparatus. This arrangement is called head-to-tail.

Figure 4:
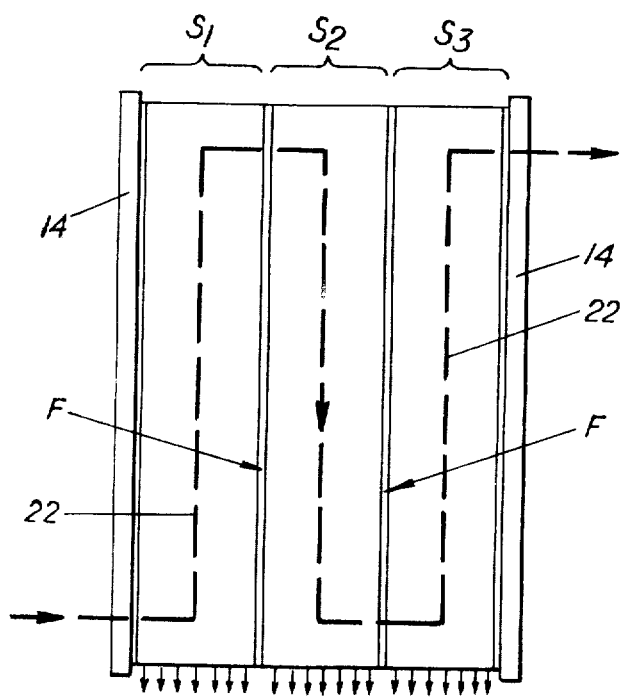
FIG. 4 is a diagrammatic view showing one way in which the fluid to be treated flows inside such an apparatus.

An advantageous embodiment of an apparatus according to the invention is shown diagrammatically in FIG. 4. This apparatus comprises, for example, three sub-combinations S1, S2 and S3, each of which possesses the same number or a different number of support-plates each having an elongated aperture 1 at each end. A support-plate denoted by the letter F, which has an elongated aperture only at one of its ends, is positioned between each sub-combination. Thus, in FIG. 4 the left-hand plate F has an aperture 1 positioned at the top of the apparatus, whilst the righthand plate F has an aperture 1 situated at the foot of the apparatus. The fluid to be treated flows through the apparatus in contact with the membranes, following the line with arrows 22. It flows in parallel inside each sub-combination, whilst it flows in series from one sub-combination to the other. The permeate is recovered in the lower part of each support-plate, the small arrows symbolising permeate issuing from each support-plate.

Figure 5:
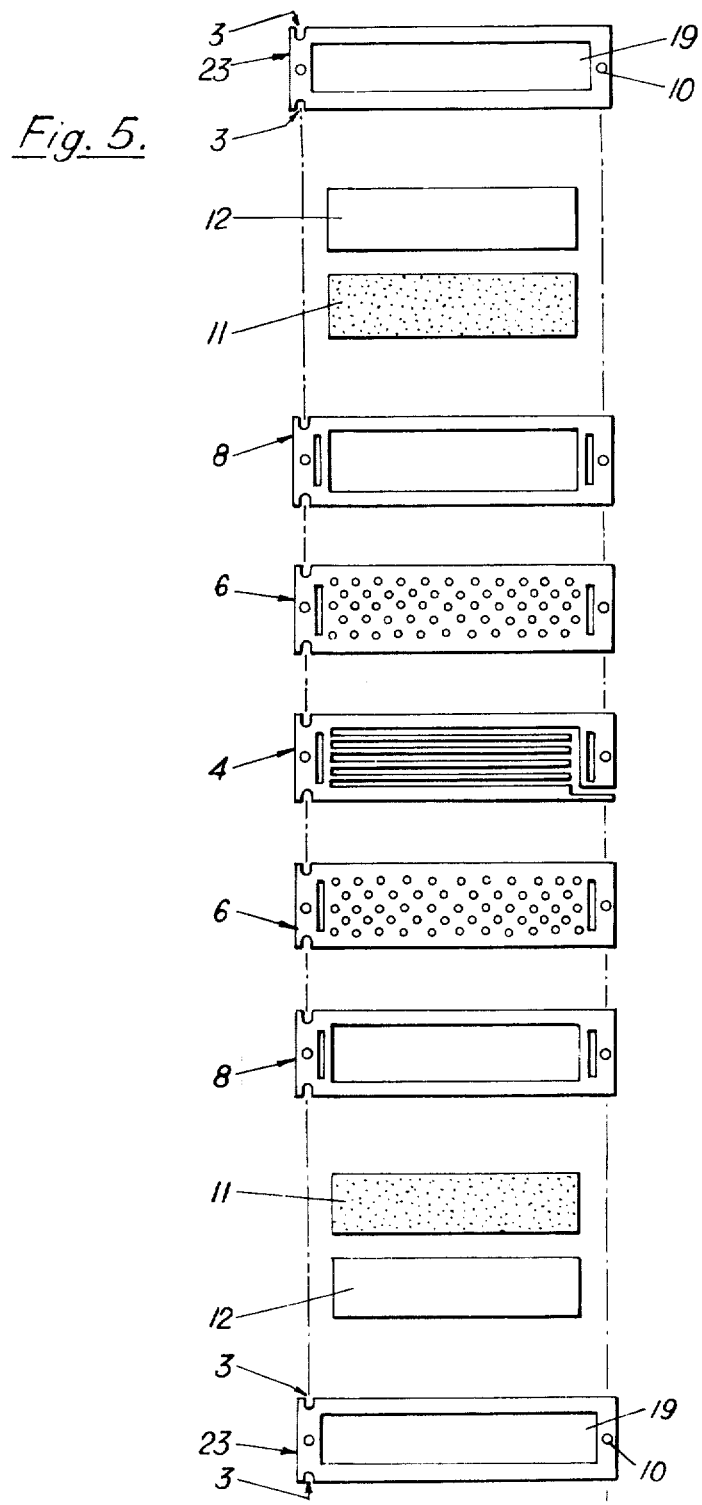
FIG. 5 is an exploded plan view of the various elements of a second embodiment of support-plate according to the invention.
Figure 6:
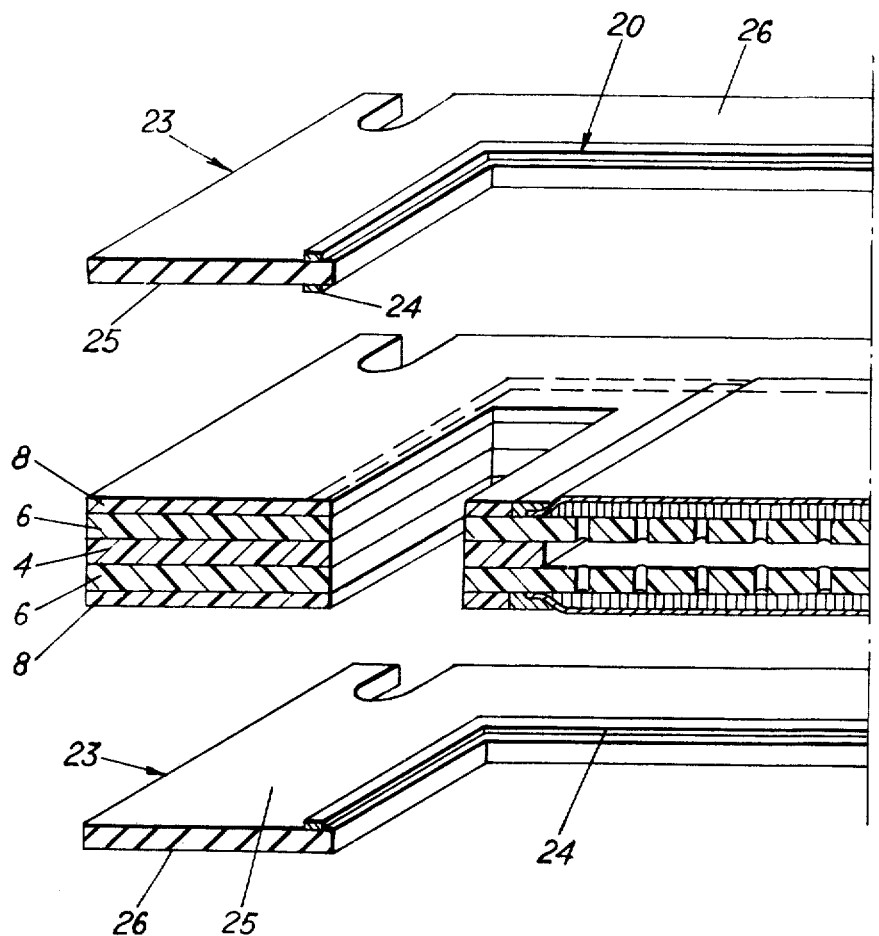
FIG. 6 is a partial view in perspective and in cross-section along a plane parallel to the longitudinal axis of the support-plate of FIG. 5, the frame-plates being represented in exploded view.

FIG. 5 shows another embodiment of support-plate according to the invention, which comprises all the flat elements 4, 6 and 8 described above, with porous supports 11 and membranes 12, but this support-plate has, on either side of each outer element 8, a frame-plate 23 fixed in a leakproof manner to the latter, for example by gluing or by means of a double-sided adhesive tape. This frame-plate 23 is rigid or semi-rigid and has substantially the same dimensions as the gasket 18 described above. When such a support-plate is being assembled, it is advantageous to place a bead 24 of non-vulcanised glue (see FIG. 6) on the face 25 of each frame-plate 23 which has to be in contact in a leakproof manner with an outer element 8. This bead 24 is positioned in substantially the same way as the leakproofing cord 20 of the gasket 18 described above, and its purpose is to ensure rigorous leakproofness, especially at the places where this frame-plate 23 covers the membrane 12 and the tape 13. This bead 24 of glue spreads out between the frame-plate 23 and the outer element 8 when they are brought into contact, thus compensating for surface unevenness, especially at the places indicated above, and is then vulcanised at ambient temperature. The bead of glue 24 can, for example, be of silicone elastomer which vulcanises at ordinary temperature under the effect of the moisture of the air or under the effect of a catalyst. In the embodiment represented in FIG. 6, only one of the two frame-plates 23 which form part of the support-plate possesses a leakproofing cord 20 on the face 26 which is not in contact with the outer element 8. This leakproofing cord, the hardness of which is advantageously less than that of the material forming the frame-plate 23, can, for example, be made of silicone elastomer, polyvinyl chloride or cellular epoxy resin and can be deposited especially by serigraphy or overmoulding. Optionally, that face of each frame-plate 23 which is not in contact with the outer element 8 can have a cord 20, but it is then advantageous for the cords 20 of the frame-plates 23 of two adjacent support-plates to be slightly staggered.

An apparatus comprising support-plates according to this embodiment is then formed simply by juxtaposing the said support-plates. The thickness of the sheet of fluid between two support-plates is then determined by the thickness of two adjacent frame-plates 23. Depending on whether the support-plates have an aperture 1 at each end or at only one end, an apparatus can permit the fluid to be treated to flow in parallel or in series between each plate. Moreover, several support-plates with an elongated aperture 1 at each end can form a sub-combination, the latter being then separated from another sub-combination by a support-plate with an elongated aperture 1 at only one of its ends. This arrangement makes it possible for the liquid to be treated to flow in parallel within each sub-combination and in series from one sub-combination to the other.

The flat elements of a support-plate according to the present invention can be made of any material which can be converted to the form of plates or sheets, especially by lamination.

Some elements of a support-plate can be made of metal, for example the intermediate elements 6, but it is more advantageous for all the elements of a support-plate to be made of plastics material, and the same applies to the frame-plate 23. As examples of the plastics material, there may be mentioned without implying a limitation, polyvinyl chloride and ABS (acrylonitrile + butadiene + styrene).

In the manufacture of flat elements made of plastics material, the cost of the material is generally low and, since the machining of the said elements is reduced in practice to a cutting-out procedure, the conditions for manufacturing a support-plate are particularly economical. Because of this, the support-plates can be discarded after the membranes have lost their properties following a long period of operation or after a membrane has, for example, become torn.

In fact, it is often more advantageous for the user to discard support-plates in which the membranes are defective and to replace them with plates equipped beforehand with membranes.

Moreover, the support-plates according to the present invention can be of large dimensions (for example 2 meters long) whilst retaining a low thickness, for example between 3 and 20 mm and preferably between 4 and 10 mm). These plates are also very light, and this makes them easy to handle.

The apparatuses provided with support-plates according to the present invention are suitable for any operations of separating fluids by selective permeability, whether these fluids are in gaseous or liquid forms and whether or not they contain suspended particles. By way of application, gas permeation as well as reverse osmosis and ultrafiltration may be mentioned. The support-plates according to the present invention can be made of plastics of medical or foodstuff quality, and this makes it particularly valuable to use them especially for the treatment of biological liquids or liquid foodstuffs. They can also be used in the chemical, paper-making and dyestuff industries.

We claim:

1. A membrane support-plate for fluid separating apparatus, said support-plate comprising a plurality of rectangular flat elements superposed in face-to-face relation and joined to one another in a leakproof manner, each flat element being substantially symmetrical relative to a median plane passing through its thickness, said elements including, in combination:
   a. at least one central flat element having means defining channels on each face for discharging the permeate;
   b. at least one intermediate flat element on each face of said central element, said intermediate elements each having holes opening into said permeate discharging means of the central element;
   c. at least one outer element on the face of each intermediate element remote from said central element, and means defining a central orifice extending through the thickness of each said outer element to provide a cell forming recess on each face of said support plate over which a membrane may be placed;

and at least one aperture at at least one of the ends of the rectangular plate, extending through each said flat element, the apertures in the various elements being superposed, for the passage of fluid to be treated, said at least one aperture extending through the entire thickness of the support-plate.

2. A membrane support-plate as claimed in claim 1, wherein said means forming channels for collecting permeate comprise a plurality of substantially parallel cutout slots and a further slot connecting said parallel slots, said slots all extending through the thickness of said central element.

3. A membrane support-plate as claimed in claim 1, and further comprising a porous support and a membrane substantially filling the central cell forming orifice of said at least one outer element, each said membrane being substantially wider than the porous support, and slightly shorter than the cell, and an adhesive tape at each transverse end of the cell adhesively secured to the associated intermediate element and the membrane, the porous support being held laterally at the base of the cell on the intermediate element.

4. A membrane support-plate as claimed in claim 3 and further comprising a frame-plate on the face of each outer element remote from the intermediate element, means defining a central window in said outer plate into which each aperture opens, the width of the window being substantially equal to the length of the aperture, but less than the width of the cell and means joining said frame-plate to the adjacent outer element.

5. A membrane support-plate as claimed in claim 4 and further comprising a bead of vulcanised material surrounding the window of each frame-plate and positioned laterally of the membrane, said bead abutting the adjacent outer element and a leakproof cord surrounding the window on the face of the membrane remote from the adjacent outer element.

6. Fluid separating apparatus including two end plates, a pipeline for feeding fluid to one of said end plates and a pipeline for removing fluid from the other of said end plates and a stack of membrane support-plates each having a membrane on each face, each said support-plate comprising a plurality of rectangular flat elements superposed in face-to-face relation and joined to one another in a leakproof manner each flat element being substantially symmetrical relative to a median plane passing through its thickness, said elements including, in combination:
   a. at least one central flat element having means defining channels on each face for discharging the permeate;
   b. at least one intermediate flat element on each face of said central element, said intermediate elements each having holes opening into said permeate discharging means of the central element;
   c. at least one outer element on the face of each intermediate element remote from said central element, and means defining a central orifice extending through the thickness of each said outer element to provide a cell forming recess on each face of said support plate over which a membrane may be placed;

and at least one aperture at at least one of the ends of the rectangular plate, extending through each said flat element, the apertures in the various elements being superposed, for the passage of fluid to be treated, said at least one aperture extending through the entire thickness of the support-plate.

7. Apparatus as claimed in claim 6, wherein each said membrane support-plate further comprises a frame-plate on the face of each outer element remote from the intermediate element, means defining a central window in said outer plate into which each aperture opens, the width of the window being substantially equal to the length of the aperture, but less than the width of the cell and means joining said frame-plate to the adjacent outer element, the frame-plates of adjacent support-plates abutting.

8. Apparatus as claimed in claim 7, and further comprising a bead of vulcanised material surrounding the window of each frame-plate and positioned laterally of the membrane, said bead abutting the adjacent outer element and a leakproof cord surrounding the window on the face of the membrane remote from the adjacent outer element.

* * * * *